United States Patent
de Oliveira

(10) Patent No.: US 6,595,531 B2
(45) Date of Patent: Jul. 22, 2003

(54) UNIT TO REPLACE THE REAR METAL AXLE IN CHILDREN'S TRICYCLES

(75) Inventor: Joaquim Matias de Oliveira, Guarulhos (BR)

(73) Assignee: Magic Toys do Brasil Ind. E Com. Ltda, Guarulhos (BR)

( * ) Notice: Subject to any disclaimer, the term of this patent is extended or adjusted under 35 U.S.C. 154(b) by 0 days.

(21) Appl. No.: 09/885,934

(22) Filed: Jun. 22, 2001

(65) Prior Publication Data

US 2002/0056968 A1 May 16, 2002

(30) Foreign Application Priority Data

Jun. 23, 2000 (BR) .......................... 8001322 U

(51) Int. Cl.[7] .............................. B62D 61/06
(52) U.S. Cl. ................ 280/62; 280/288.3; 280/282
(58) Field of Search ................ 280/62, 29, 240, 280/261, 282, 287, 270, 288.1, 288.3; 301/111.01, 111.06, 121

(56) References Cited

U.S. PATENT DOCUMENTS

| | | | | | |
|---|---|---|---|---|---|
| 3,039,791 | A | * | 6/1962 | Horowitz et al. | ........... 280/282 |
| 3,827,719 | A | * | 8/1974 | Lohr et al. | ................... 280/282 |
| 3,907,331 | A | * | 9/1975 | Lohr et al. | ................... 280/282 |
| 4,865,337 | A | * | 9/1989 | Disler et al. | ................. 280/278 |
| 4,887,829 | A | * | 12/1989 | Prince | ........................ 180/215 |
| 4,958,842 | A | * | 9/1990 | Chang | ........................ 280/282 |
| 5,188,430 | A | * | 2/1993 | Chiu | ..................... 301/111.01 |
| 5,240,267 | A | * | 8/1993 | Owsen | ................ 280/124.103 |
| 5,503,411 | A | * | 4/1996 | Sundberg et al. | ........... 280/282 |
| 5,553,879 | A | * | 9/1996 | Niemeyer et al. | .......... 280/229 |
| 5,568,934 | A | * | 10/1996 | Niemeyer | ................... 280/282 |
| 5,957,544 | A | * | 9/1999 | Hu | ........................... 280/47.38 |
| 6,095,543 | A | * | 8/2000 | McMahon et al. | .......... 280/282 |
| 6,305,487 | B1 | * | 10/2001 | Montague | ................... 180/348 |

* cited by examiner

Primary Examiner—Brian L. Johnson
Assistant Examiner—Hau Phan
(74) Attorney, Agent, or Firm—Birch, Stewart, Kolasch & Birch, LLP

(57) ABSTRACT

A unit to replace the rear metal axles of children's tricycles, characterized by the fact that the unit is integrated with tricycle body (12) and is formed by an axle support (5), which is made up of three walls (13, 14, 15) and is integral with corresponding axle bridges (1, 1'), where two rear wheels (18) of the tricycle are enclosed, whereby at its outer end each axle bridge has a circular peripheral protruding ring (3; 20) and at its inner end it has a circular peripheral protruding ring (4; 21).

3 Claims, 7 Drawing Sheets

UNIT TO REPLACE THE REAR METAL AXLE IN CHILDREN'S TRICYCLES

BACKGROUND OF THE INVENTION

1. Field of the Invention

This utility model refers to a unit that, owing to its particular design and structural-technique features, eliminates the rear metal axle of a child's tricycle since the (two) new axle bridges are integrated into the actual plastic body for mounting the rear wheels.

2. Description of Related Art

As the name suggests, children's tricycles are vehicles that have one front wheel and two rear wheels that are connected by an axle. Said axle is normally made of metal and rests on two supports that are fixed to the chassis of the tricycle, and the wheels are mounted on the free ends of the axle by means of bushings, etc.

BRIEF SUMMARY OF THE INVENTION

The purpose of this utility model is to create a unit that makes it possible to eliminate this metal axle and that is integrated into the plastic body of the tricycle itself. This will make it much simpler to mount the wheels on the body by eliminating bushings, reducing weight, and significantly decreasing the cost of the product.

The elimination of the metal axle, in addition to the advantages mentioned in the previous section, also provides other major advantages that are cited below and that help to make this utility model better conform to the standards of the I.Q.B. (Institute for the Quality of Toys and Articles for Children) and those of the INMETRO (National Institute of Metrology, Standardization, and Industrial Quality) which provide warnings regarding the presence of small parts that can be swallowed in products that are intended for children under the age of three, who constitute the majority of the users of these kinds of toys.

These additional advantages include the elimination of the risk of children swallowing small components (bushings, retaining pins, copilha); the elimination of sharp edges that may be present on the bridges of the metal axles; the elimination of the risk of peeling from the zinc bath or of the peeling of paint that may be present on the metal axles; and the elimination of any and all metal parts that can rust, including the metal axle itself.

To do this, the two axles that it takes to attach the wheels are molded together onto the lower ends of the supports fixed to the tricycle chassis, thereby eliminating the need for a metal axle.

BRIEF DESCRIPTION OF THE DRAWINGS

This utility model will be further illustrated by the attached drawings, wherein.

DETAILED DESCRIPTION OF THE INVENTION

Figure 1:
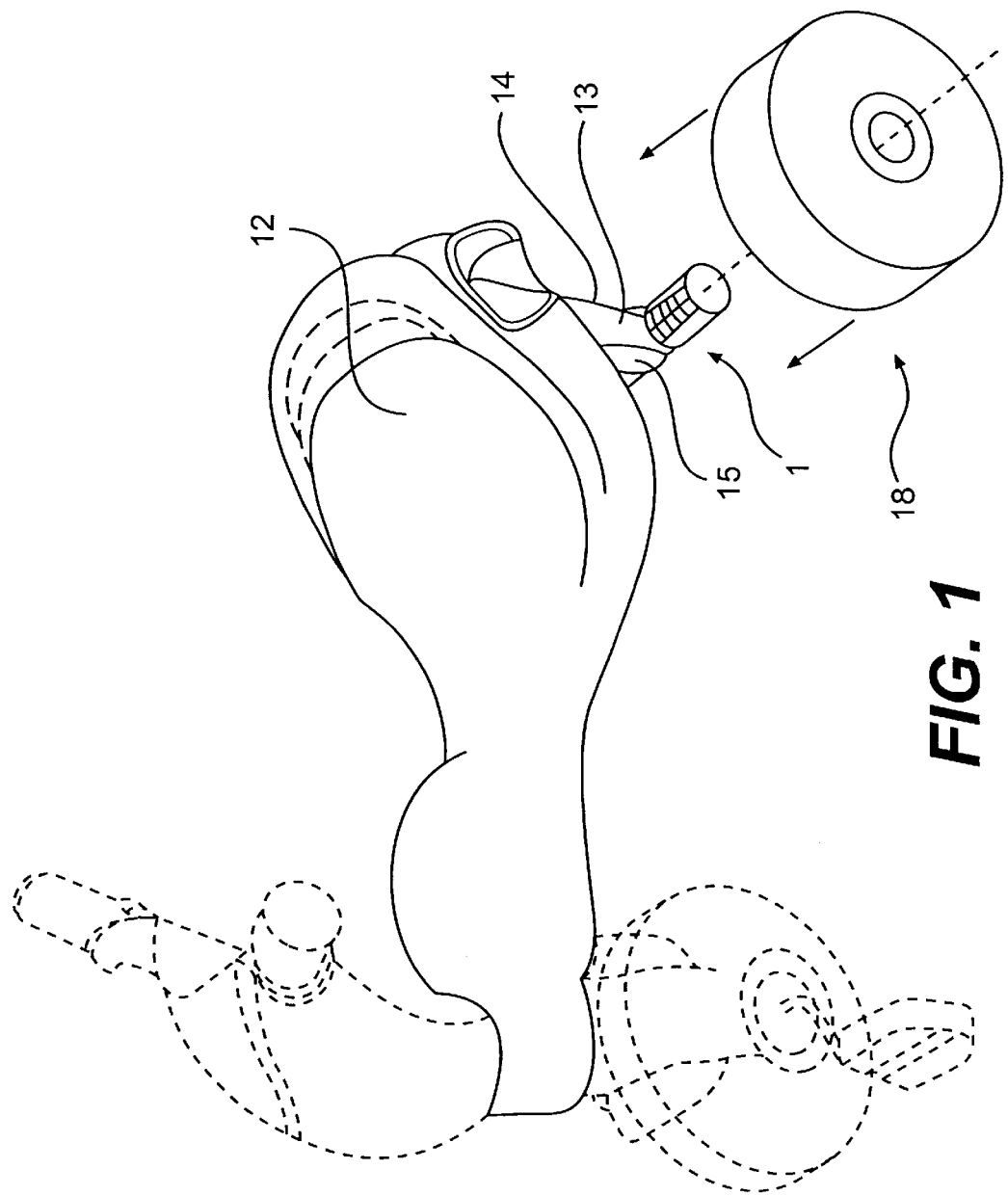
FIG. 1 shows a perspective view of the body of a child's tricycle and the corresponding wheel, illustrating the unit for replacing the rear axle of the child's tricycle that is the object of this utility model.

FIG. 1 shows an overall perspective view of the product, presenting an exploded view of the area of the rear of the tricycle, which area is the object of this utility model. Thus, body 12 of the tricycle is shown which, in its rear, has the unit of this utility model to which a rear wheel 18 will be connected.

Said unit is made up of an axle bridge 1 and an axle support that is formed by three walls 13, 14, 15.

Figure 2:
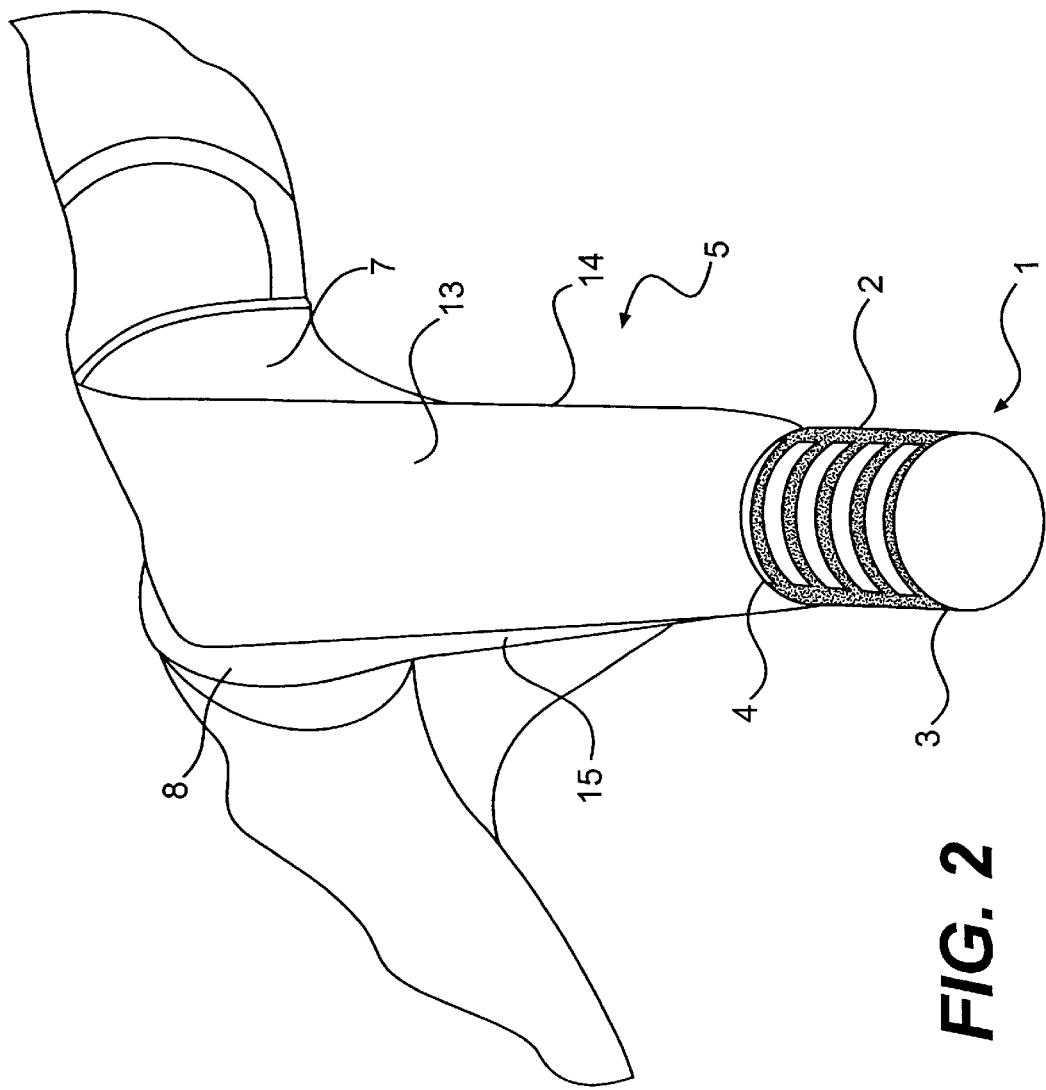
FIG. 2 shows a partial enlarged perspective view that illustrates the unit of this utility model.

FIG. 2 shows a perspective view of above-mentioned plastic axle 1 of cylindrical design and a series of parallel re-entering angles 2 that are arranged in rows that are also parallel at their tops, whose purpose is to reduce the amount of material used and which at their outer ends have protruding round peripheral rings 3, which are intended to secure the wheel.

The length of the plastic axle bridge will be a direct function of the width of wheel 18 and can thus have series of parallel re-entering angles 2 as their number increases or decreases.

On the inner end of the axle bridge, there is also a protruding ring 4 to prevent any wearing away of the lateral walls of the wheel with respect to the area that was referred to as fixed axle support 5.

Figure 3:
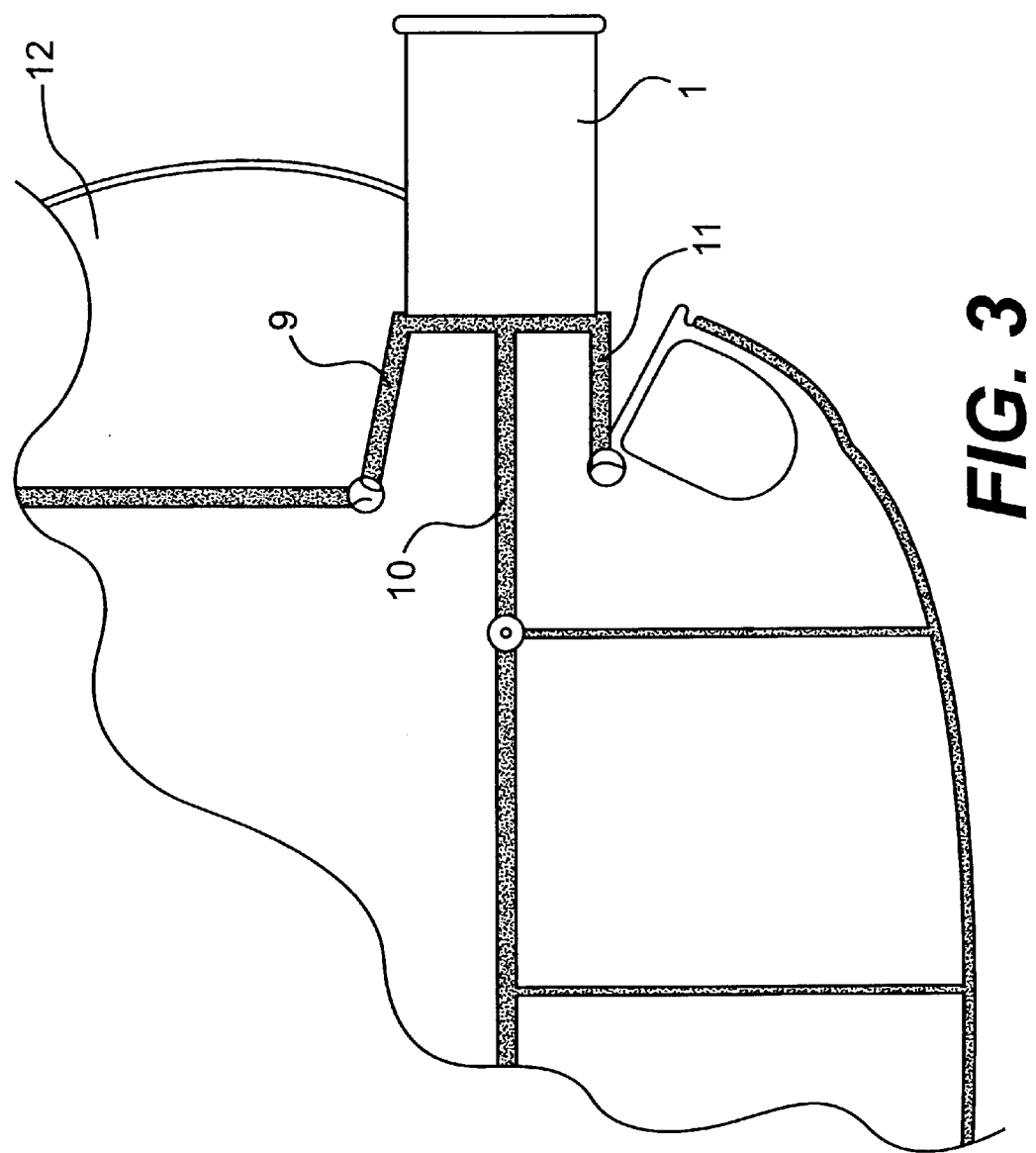
FIG. 3 shows a partial schematic view of the lower area where the unit according to this utility model is located.

FIG. 3 shows a schematic view of the lower part of the area that is the subject of this utility model, showing the lower part of cylindrical axle bridge 1, whose surface is completely smooth in order to allow the wheel to rotate more easily.

Above-mentioned rear axle 1 is an integral part of its own axle support 5, which is referred to as an axle support solely for the sake of simplicity.

Fixed axle support 5 has unique design and structural characteristics to ensure that it will provide reliable mechanical support of the weight of the product itself, the weight of the child, and any impacts expected in connection with the use of the toy.

As mentioned above, fixed axle support 5 is an integral part of the cylindrical axle bridge, whereby the cylindrical axle is attached to the bridge at its lower part and forms with it an "L" and in its upper part is integral with body 12 in terms of its own shape, as well as through various ribs 7, 8 (shown in FIG. 2) and 9, 10, and 11 (shown in FIG. 3) that help attach it more solidly to the body by avoiding torsion in the axial direction.

Ribs 7, 8, 9, 10, and 11, which complete axle support 5, are also of a length, height, and thickness that are determined by structural calculations that are aimed at ensuring safety, light weight, and aesthetic quality.

In looking at fixed axle support 5 from its outside (FIG. 1) or in the enlarged perspective view (FIG. 2), it is clear that the support is a shaped profile that is perpendicular to the body and is slightly tilted with respect to the horizontal.

In terms of its shape, fixed axle support 5 is formed by three walls 13, 14, and 15, which are arranged virtually in parallel and are slightly splayed at the bottom.

From the inside of fixed axle support 5 there originates a fourth wall that is formed by rib 10 (see FIG. 3), with central-rib characteristics, that is interconnected to the fixed axle support facing it.

Figure 4:
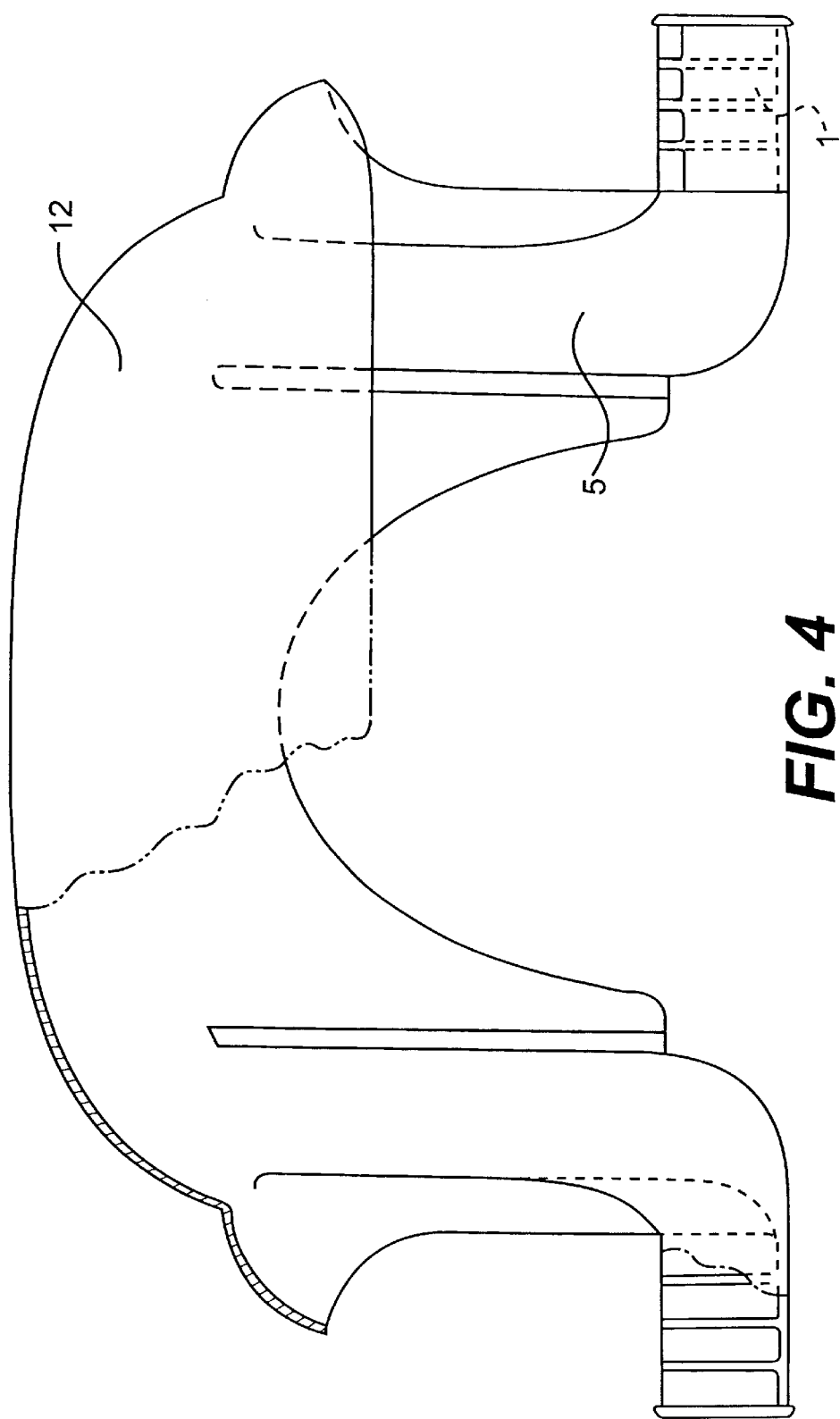
FIG. 4 shows a partial rear cut-away of the tricycle chassis.

FIG. 4 shows a rear view of the tricycle chassis, illustrating how axle bridge 1, axle support 5, and chassis or body 12 are integrated into a single piece.

Figure 5:
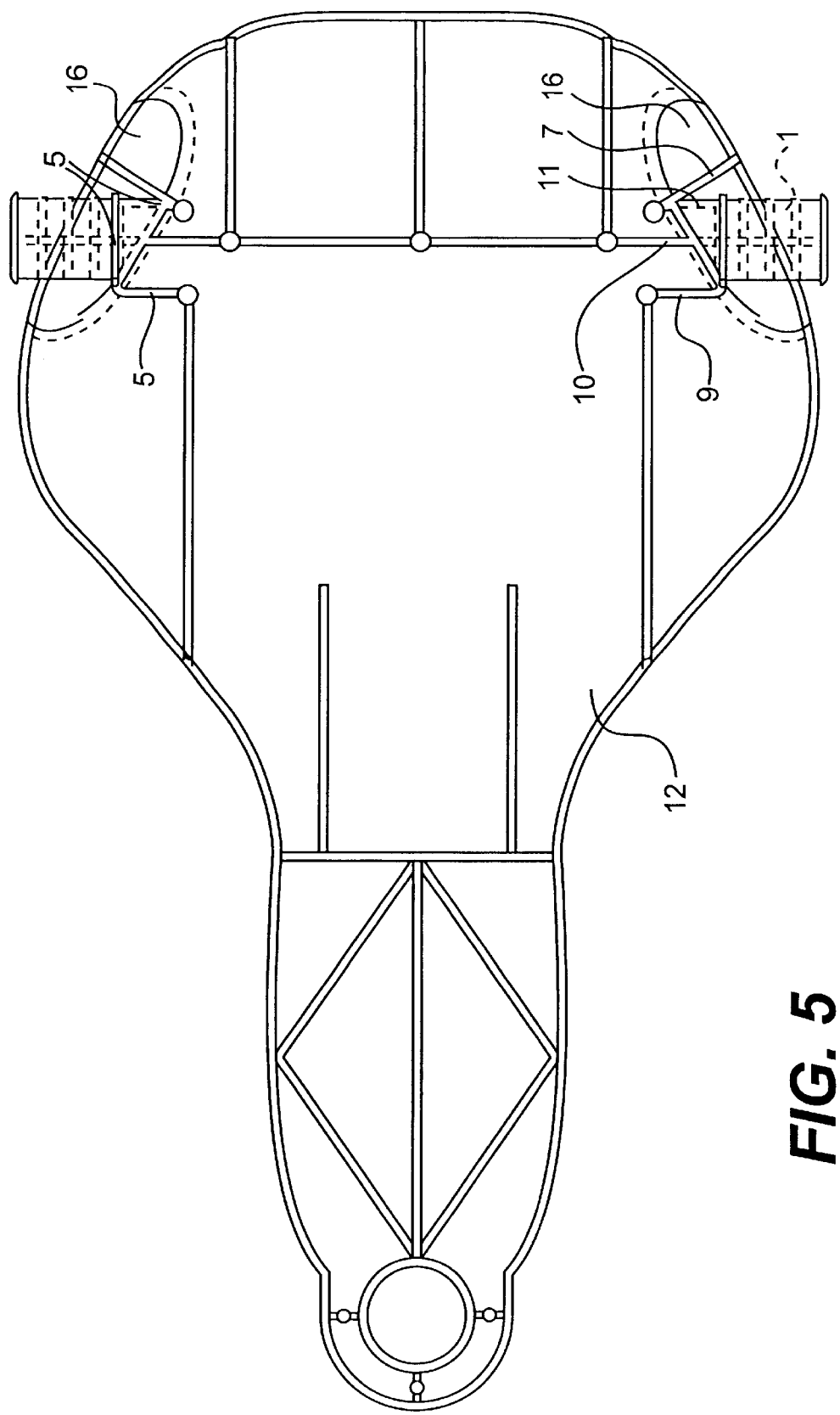
FIG. 5 shows a plan view from below of the tricycle body.

FIG. 5 shows a view of the lower part of tricycle body 12, indicating the positions of axle bridges 1 plus axle support 5 and ribs 9, 10, and 11, which are interconnected or are connected to chassis 12 with upper lateral openings 16 (mud guards), whereby said openings are required in order to allow injection molding and will subsequently be outfitted with lights 17 for closing and locking.

Figure 6:
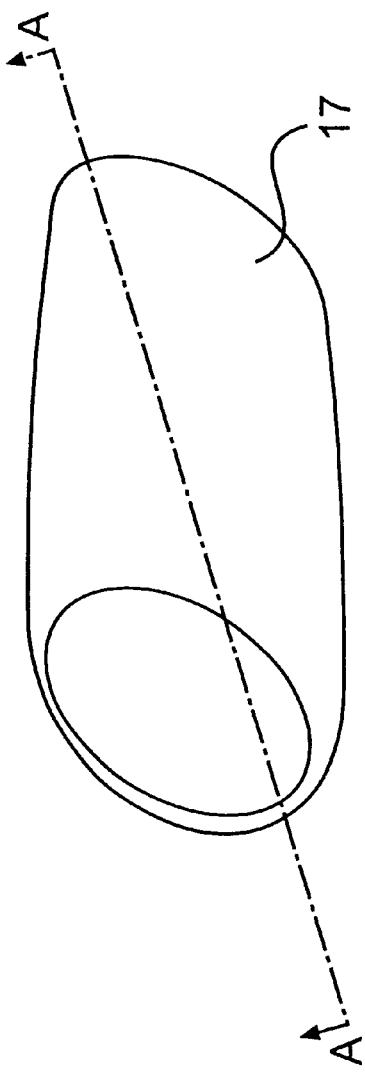
FIG. 6 shows a perspective view of the light that is to be mounted on the tricycle that is equipped with the unit according to this utility model.
Figure 7:
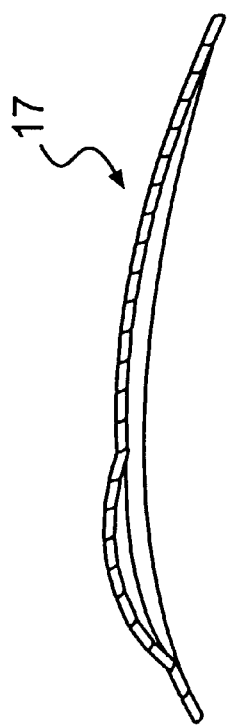
FIG. 7 shows a cut-away along A—A of FIG. 6.
Figure 10:
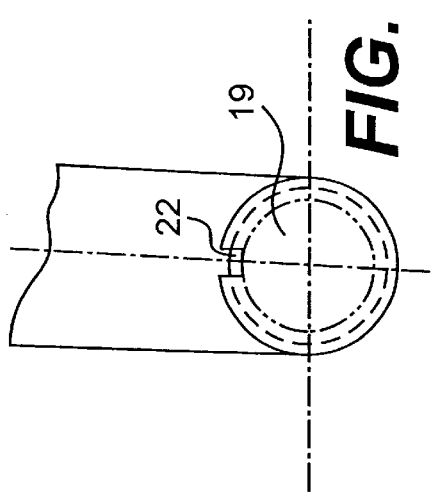
FIG. 10 shows a front view of the second version of the unit according to this utility model.
Figure 11:
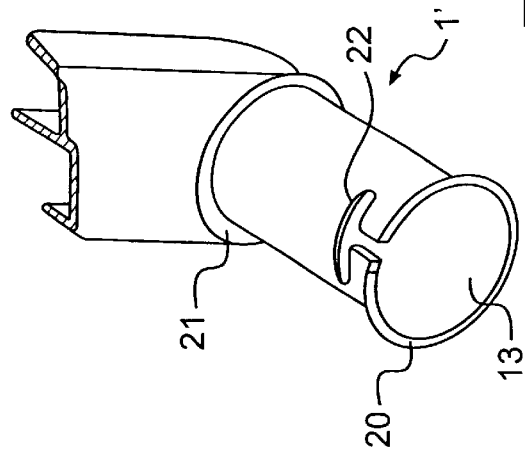
FIG. 11 shows a perspective view of the second version of the unit according to this utility model.
Figure 8:
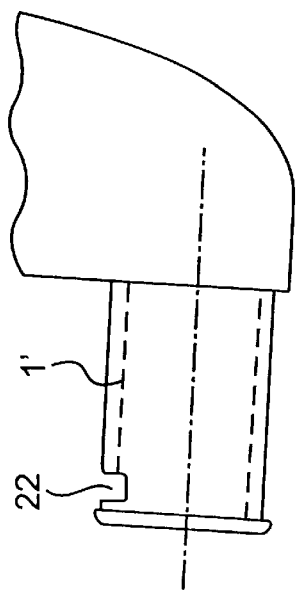
FIG. 8 shows a lateral front view of a second version of the unit according to this utility model.
Figure 9:
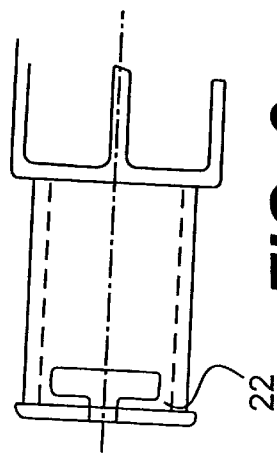
FIG. 9 shows a plan top view of the second version of the unit according to this utility model.

FIGS. 6 and 7 show, respectively, a perspective view and a cut-away view along line A—A of light 17.

FIGS. 8–11 present a second version of plastic axle bridge 1', which will have the same final dimensions, as well as the same ultimate purpose and technical advantages mentioned above.

Said second version will also be of a completely smooth tubular cylindrical design that is completely lightened on inside 19, which contains the same protruding rings at its ends 20 and 21 and a slit 23 at its upper end that allows it to be compressed slightly, thereby making it easier to mount the wheel.

What is claimed is:

1. A unit to replace the rear metal axles of children's tricycles, wherein said unit is integrated within a tricycle body and is formed by an axle support which is made up of three walls and is integral with corresponding axle bridges, said axle bridges have an outer end and an inner end, where two rear wheels of the tricycle are enclosed, whereby at the outer end each axle bridge has a first circular peripheral protruding ring and at the inner end a second circular peripheral protruding ring, and wherein the axle support is fixed and connected to the axle bridges at a lower part of the bridges, forming an "L" with the bridges, and an upper part thereof joins with the tricycle body by virtue of its shape and by means of various ribs, and wherein the axle bridges, the axle support, and the ribs connect to define the unit having upper lateral openings in which lights may be later inserted.

2. The unit in accordance with claim 1, wherein each axle bridge is cylindrical in shape and has a series of parallel re-entering angles, which are arranged in rows that are also parallel at their tops.

3. The unit in accordance with claim 1, wherein each axle bridge is cylindrical in shape, is hollow inside, and has a slit at an outer end.

* * * * *